(12) United States Patent
Hysko, Jr. et al.

(10) Patent No.: US 8,630,785 B2
(45) Date of Patent: Jan. 14, 2014

(54) FUEL MANAGEMENT SYSTEMS AND METHODS FOR VARIABLE DISPLACEMENT ENGINES

(75) Inventors: Gerald J. Hysko, Jr., Grand Blanc, MI (US); Christopher M. Noel, Birmingham, MI (US); Alfonso G. Hysko, Belleville, MI (US)

(73) Assignee: GM Global Technology Operations LLC

( * ) Notice: Subject to any disclaimer, the term of this patent is extended or adjusted under 35 U.S.C. 154(b) by 1045 days.

(21) Appl. No.: 12/629,141

(22) Filed: Dec. 2, 2009

(65) Prior Publication Data

US 2011/0130943 A1 Jun. 2, 2011

(51) Int. Cl.
*G06F 19/00* (2011.01)
(52) U.S. Cl.
USPC ............................................ 701/103; 701/104

(58) Field of Classification Search
USPC ............ 701/103, 114, 115, 104; 123/184, 46, 123/399, 396
See application file for complete search history.

(56) References Cited

U.S. PATENT DOCUMENTS

| 4,574,757 | A | * | 3/1986 | Schulman et al. | ............ 123/396 |
| 4,590,909 | A | * | 5/1986 | Heintz | ............ 123/360 |
| 2007/0105679 | A1 | * | 5/2007 | Tabata et al. | ............ 475/5 |
| 2008/0245338 | A1 | * | 10/2008 | Bauer et al. | ............ 123/399 |
| 2010/0211297 | A1 | * | 8/2010 | Doering et al. | ............ 701/112 |

FOREIGN PATENT DOCUMENTS

CN 1768221 5/2006

* cited by examiner

*Primary Examiner* — Marthe Marc-Coleman

(57) ABSTRACT

A fuel management system includes a pedal resistance determination module and a pedal resistance adjustment module. The pedal resistance determination module determines a desired accelerator pedal resistance based on at least one of engine and transmission operating conditions. The pedal resistance adjustment module adjusts a pedal resistance device based on the desired accelerator pedal resistance.

17 Claims, 3 Drawing Sheets

FUEL MANAGEMENT SYSTEMS AND METHODS FOR VARIABLE DISPLACEMENT ENGINES

FIELD

The present disclosure relates to variable displacement engines, and more particularly to fuel management systems and methods for variable displacement engines to improve fuel economy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Variable displacement engines provide improved fuel economy and desired torque on demand using cylinder deactivation. When high output torque is required, all cylinders of a variable displacement engine are supplied with fuel and air (i.e., a full-cylinder mode). At low engine speeds, low load, and/or other inefficient conditions, some of the cylinders (for example only, half of the cylinders) may be deactivated to reduce throttle losses and improve fuel economy (i.e., a deactivated mode). The engine may be transitioned from the deactivated mode to the full-cylinder mode when a driver depresses an accelerator pedal to request a torque greater than that can be achieved in the deactivated mode, thereby requiring all cylinders to be active.

SUMMARY

A fuel management system includes a pedal resistance determination module and a pedal resistance adjustment module. The pedal resistance determination module determines a desired accelerator pedal resistance based on at least one of engine and transmission operating conditions. The pedal resistance adjustment module adjusts a pedal resistance device based on the desired accelerator pedal resistance.

In one feature, the pedal resistance determination module determines a first desired pedal resistance when an engine is in a full-cylinder mode and a second desired pedal resistance when the engine is in a deactivated mode. The second desired pedal resistance is variable and is greater than the first pedal resistance at least when the engine is about to be transitioned to the full-cylinder modes.

A method of reducing fuel consumption includes determining a desired accelerator pedal resistance based on at least one of engine and transmission operating conditions, and adjusting a pedal resistance device based on the desired accelerator pedal resistance.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
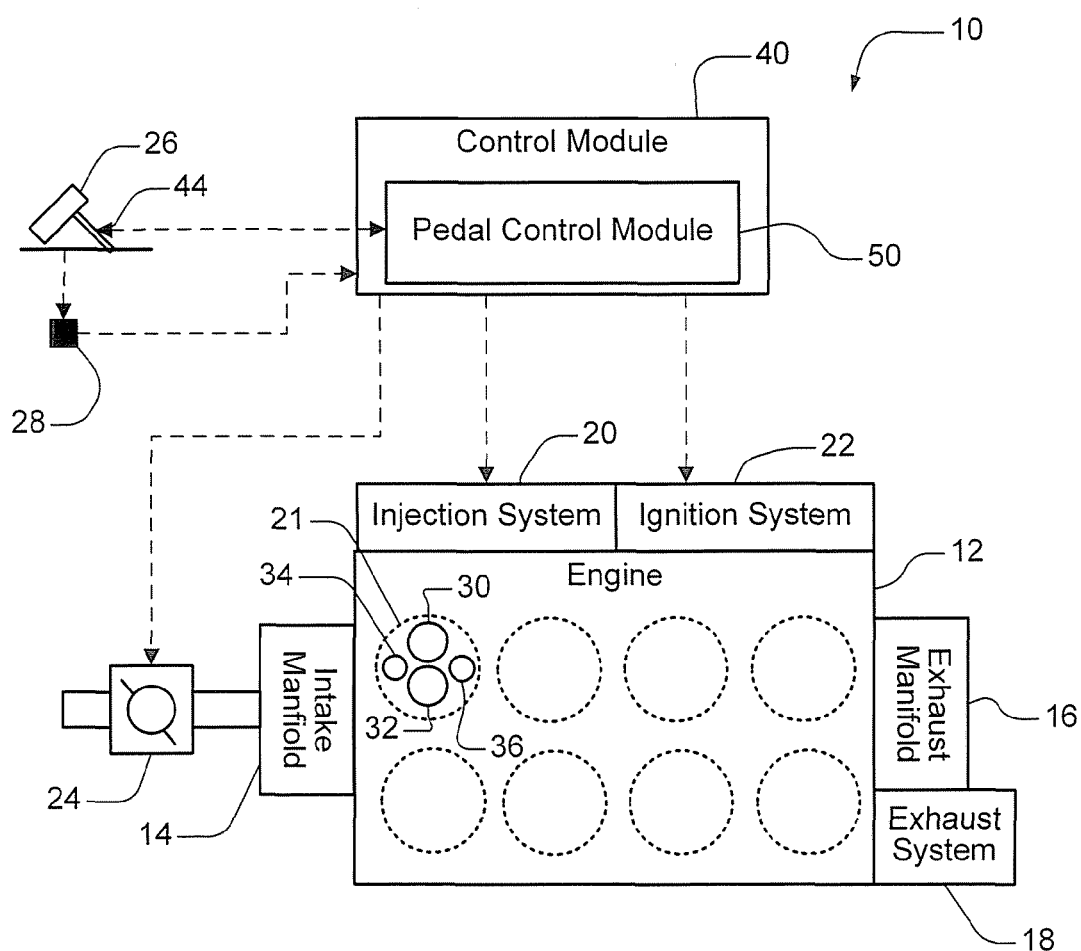
FIG. 1 is a functional block diagram of an exemplary engine system that includes a fuel management module according to the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit.

The fuel management system according to the present disclosure increases pedal resistance against an accelerator pedal when the engine is in a deactivated mode, particularly when the engine is about to activate additional cylinders and to be transitioned to a full-cylinder mode. Accordingly, a driver may need to apply greater pedal force in the deactivated mode than in the full-cylinder mode for the same degree of pedal depression. The fuel management system reduces likelihood of switching the engine from the deactivated mode to the full-cylinder mode caused by inadvertent driver behavior. By enabling the engine to stay in the deactivated mode more often and for longer periods, the fuel management system improves fuel economy.

In addition, the fuel management system according to the present disclosure may increase pedal resistance against an accelerator pedal when the engine is in the full-cylinder mode and when the engine is close to entering the deactivated mode. The increase in pedal resistance during the full-cylinder mode prevents a driver from changing the current engine operating conditions and maximizes transitioning of the engine from the full-cylinder mode to the deactivated mode.

Referring to FIG. 1, an engine system 10 includes an engine 12, an intake manifold 14, an exhaust manifold 16, an exhaust system 18, an injection system 20, and an ignition system 22. The engine 12 is a variable displacement engine and includes multiple cylinders 21. While eight cylinders 21 are shown, the engine 12 may include any number of cylinders.

Air is drawn into an intake manifold 14 through a throttle 24 and is distributed into the cylinders 21. Each cylinder 21 includes an intake valve 30, an exhaust valve 32, a fuel injector 34, and a spark plug 36. For the sake of clarity, only one intake valve 30, exhaust valve 32, fuel injector 34, and spark plug 36 are illustrated.

The fuel injector 34 injects fuel that is combined with the air as the air is drawn into the cylinder 21. A piston (not shown) compresses the air/fuel mixture within the cylinder 21. The spark plug 36 initiates combustion of the air/fuel mixture, forcing the piston to reciprocate in the cylinder 21. The piston drives a crankshaft (not shown) to produce drive torque. Combustion exhaust within the cylinder 21 is forced out an exhaust port when the exhaust valve 32 is opened. The exhaust is treated in an exhaust system 18 and released to the atmosphere.

The throttle 24 regulates mass air flow into the intake manifold 14 based on a position of an accelerator pedal 26. The pedal position is measured by a pedal position sensor 28. The pedal position sensor 28 detects the position of the accelerator pedal 26 and transmits a corresponding signal to a control module 40. The control module 40 determines a desired engine torque based on the pedal position and controls the throttle 24 accordingly.

A pedal resistance device 44 is provided on a side of the accelerator pedal 26. For example only, the pedal resistance device 44 may include a solenoid and a plunger (both not shown). The plunger may be mounted in the solenoid and connected to the accelerator pedal 26. When the driver depresses the accelerator pedal 26 and applies a pedal force on the accelerator pedal 26, the solenoid may be energized by electric current to move the plunger against the accelerator pedal 26. Therefore, the plunger applies a pedal resistance against the pedal force applied by the driver. When the driver lifts his/her foot off the accelerator pedal 26, the pedal resistance pushes the accelerator pedal 26 back to its original (i.e., released) position.

The control module 40 includes a pedal control module 50 that adjusts pedal resistance of the resistance device 44 depending on engine and/or transmission operating modes. When the engine 12 operates in a more fuel efficient mode (for example, a deactivated mode), the pedal control module 50 increases the pedal resistance. The increased pedal resistance prevents the engine 12 from switching to a less fuel efficient mode (for example, a full cylinder mode) due to a driver's inadvertent behavior.

Figure 2:
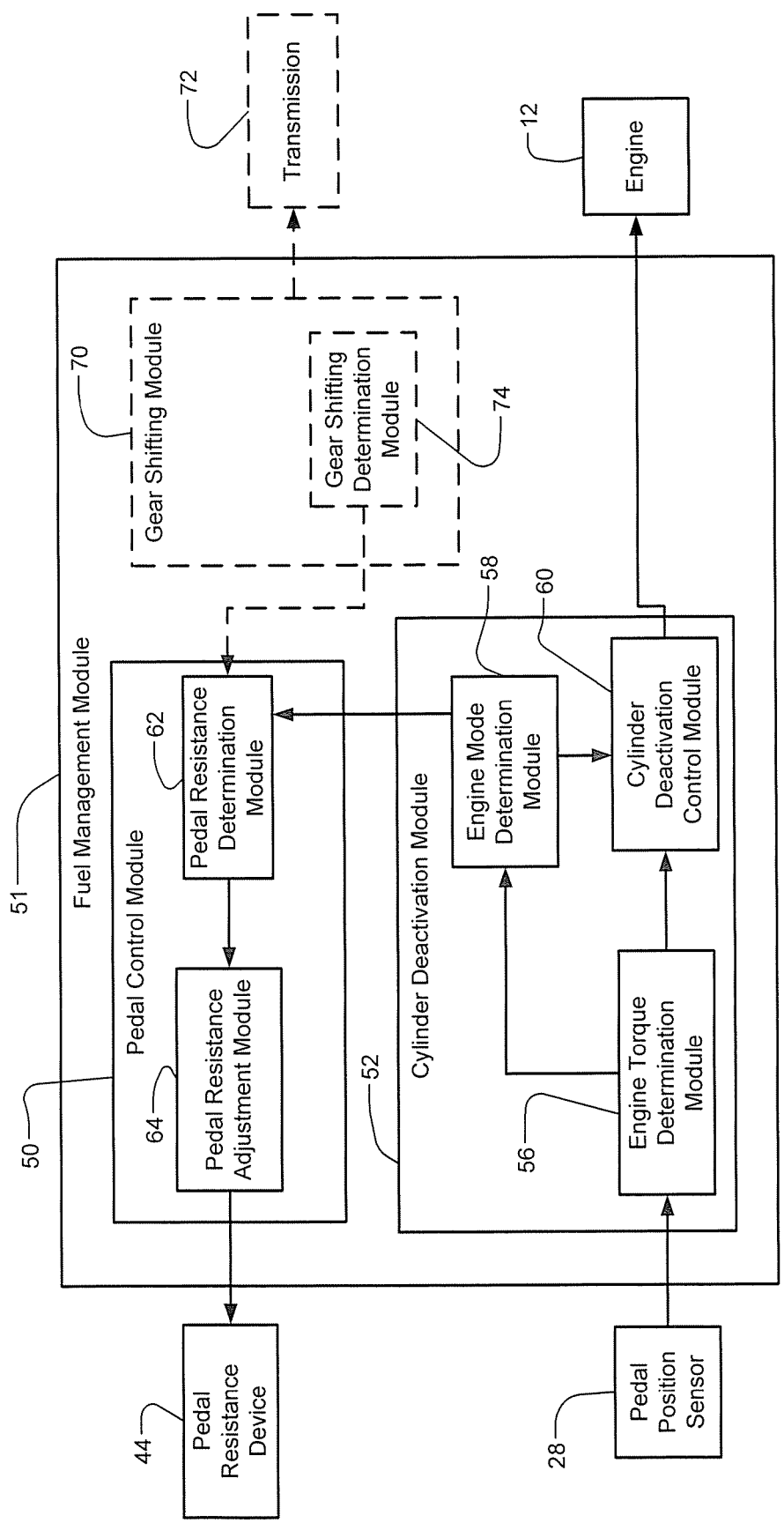
FIG. 2 is a functional block diagram of a fuel management module according to the present disclosure.

Referring to FIG. 2, the pedal control module 50 may be a part of a fuel management module 51. The fuel management module 51 further includes a cylinder deactivation module 52. The cylinder deactivation module 52 deactivate some of the cylinders 21 based on engine operating conditions including, but not limited to, engine load and engine speed.

More specifically, the cylinder deactivation module 52 includes an engine torque determination module 56, an engine mode determination module 58, and a cylinder deactivation control module 60. The engine torque determination module 56 communicates with the pedal position sensor 28 and determines desired engine torque based on the pedal position (i.e., the degree of pedal depression). The engine mode determination module 58 receives signals indicative of a desired engine torque and determines a desired engine mode based on the desired torque.

The engine 12 may be operated between a full-cylinder mode and a deactivated mode (or a reduced cylinder mode). When high output torque is desired, the engine 12 is operated in the full-cylinder mode and all cylinders 21 are active and are supplied with fuel and air. When less engine torque is desired and engine speed limitations are not exceeded, the engine 12 is operated in the deactivated mode. In the deactivated mode, some of the cylinders 21 (for example, half) are deactivated. Disabling cylinders 21 may be achieved, for example only, by disabling fueling to one or more cylinders and by closing the intake and exhaust valves 30 and 32 associated with the cylinder(s) to be deactivated. Based on the desired engine mode, the cylinder deactivation control module 60 transitions the engine 12 to a full-cylinder mode or a deactivated mode.

The engine 12 may be transitioned from the deactivated mode to the full-cylinder mode when the accelerator pedal 26 is depressed to a threshold position. At the threshold position, the manifold air pressure (MAP) is increased to a threshold pressure. The threshold pressure may correspond to the maximum torque the engine 12 can provide in the deactivated mode. Alternatively, the threshold pressure may correspond to a maximum manifold air pressure without causing an unacceptable level of noise, vibration, and harshness (NVH) to the vehicle. When the engine 12 is transitioned to the full-cylinder mode, additional fuel is added to the non-firing cylinders and spark timing is retarded to smooth the transitions.

The pedal control module 54 includes a pedal resistance determination module 62 and a pedal resistance adjustment module 64. When the engine 12 runs in a full-cylinder mode, the pedal resistance determination module 62 determines a first pedal resistance as the desired pedal resistance. When the engine 12 runs in a deactivated mode, the resistance determination module 62 determines a second pedal resistance as the desired pedal resistance. The first pedal resistance and the second pedal resistance may be constant or vary with, for example only, MAP (based on pedal position), engine torque, or engine speed.

The first pedal resistance and the second pedal resistance may be set to be constant or variable. When the first pedal resistance and the second pedal resistance are constant, the second pedal resistance may be set to be greater than the first pedal resistance to require more force to re-activate the deactivated cylinders. When the second pedal resistance is variable, the second pedal resistance may be increased to be greater than the first pedal resistance at least when the engine is about to re-activate the deactivated cylinders. In other words, the second pedal resistance may be increased at least when the engine operating conditions are within a predetermined range of enabling conditions under which the engine is transitioned from the deactivated mode to the full-cylinder mode.

By way of an example, the engine may be transitioned from the full cylinder mode to the deactivated mode when the MAP is reduced to a first threshold. In the deactivated mode, the pedal resistance may remain the same until the MAP is increased to a second threshold that is higher than the first threshold. When the MAP is above the second threshold, the engine 12 may be close to re-activating additional cylinders. Therefore, when the MAP is between the first threshold and the second threshold, the pedal resistance may be increased to help maintain the engine 12 in the deactivated mode.

The first pedal resistance may be variable and may be increased when the engine is close to entering the deactivated mode from the full-cylinder mode. More specifically, when the engine operating conditions are within a predetermined range of enabling conditions under which the engine is transitioned from the full-cylinder mode to the deactivated mode, the engine will enter the deactivated mode soon. To prevent a driver from changing the current engine operating conditions away from the enabling conditions by inadvertently depressing the accelerator pedal, the first pedal resistance may be increased. Therefore, the increased pedal resistance enables the engine to enter the deactivated mode more quickly under the current engine operating conditions without being interrupted by the driver's inadvertent depression of the accelerator pedal.

The pedal resistance adjustment module 64 adjusts the pedal resistance device 44 based on the desired pedal resistance. Therefore, when the pedal resistance is increased in the deactivated mode, a driver needs to apply a greater pedal force than is generally required in the full-cylinder mode to achieve the same degree of pedal depression. Therefore, the pedal control module 54 reduces a likelihood of accidentally transitioning the engine 12 from a deactivated mode to a full-cylinder mode despite a driver's inclination to apply a greater amount of force than desired to the accelerator pedal.

For example, a driver may intend a slight acceleration and a slight torque increase when the engine 12 is in the deactivated mode. The driver may, however, improperly or inadvertently apply a greater amount of force than desired to the accelerator pedal 26. When the accelerator pedal 26 is depressed to a threshold position, the control module 40 may interpret the degree of pedal depression as a demand for engine torque from all active cylinders 21. As a result, the engine 12 may be transitioned from the deactivated mode to the full-cylinder mode.

The pedal control module 54 of the present disclosure requires the driver to apply a greater pedal force than is required in a full-cylinder mode for the same degree of pedal depression. The pedal control module 54 reduces the likelihood of inadvertently depressing the accelerator pedal 26 to the threshold position to trigger the full-cylinder mode. Because the engine 12 is maintained in the deactivated mode more often, fuel economy is improved.

The pedal control module 54 may be used with any fuel efficiency control systems to save fuel consumption even in a full-cylinder mode. For example, the pedal control module 54 may communicate with a gear shifting module 70. The engine 12 may be considered to run in a more fuel efficient mode when a transmission 72 is in high gears (for example only, when the vehicle overdrives with gear ratios less than one).

The automatic transmission 72 may undergo a downshift when a throttle opening (e.g., based on a pedal position) is increased for acceleration. A downshift results in an increase in torque output and an increase in engine speeds, thereby increasing fuel consumption. While downshift is desired for most vehicle acceleration, the driver may inadvertently or improperly apply a greater force than desired to the accelerator pedal 26 to unnecessarily trigger a downshift. In this situation, fuel consumption is higher.

Therefore, the pedal control module 54 may be used with the gear shifting module 70 to reduce the likelihood of unnecessary downshifts to improve fuel economy. The gear shifting module 70 may include a gear shifting determination module 74 that determines a target (or desired) gear or gear ratio based on vehicle speed and throttle opening. The pedal control module 54 may respond to the determination of the target gear or gear ratio and adjust the pedal resistance accordingly.

For example only, when the target gear is a lower gear than an attained gear or when a target gear ratio is greater than an attained gear ratio, the engine 12 will be operated in a less fuel efficient manner after gear shifting. As such, the pedal control module 54 may determine a first pedal resistance as the desired pedal resistance after gear shifting. When the target gear is a higher gear than the attained gear or when the target gear ratio is smaller than the attained gear ratio, the engine 12 will be operated in a more fuel-efficient manner after gear shifting. Therefore, the pedal control module 54 determines a second pedal resistance as the desired pedal resistance after gear shifting. The second pedal resistance is greater than the first pedal resistance. When the automatic transmission 72 is in a higher gear and the engine 12 runs in a more fuel-efficient manner, the increased pedal resistance against the accelerator pedal 26 requires a greater pedal force from the driver to trigger a downshift. Therefore, the pedal control module 54 reduces the likelihood of unnecessary downshifts, thereby improving fuel economy.

The pedal resistance may vary with gear ratios. For example, the pedal resistance may be the greatest when the transmission 74 is in the highest gear. The pedal resistance may be the lowest when the transmission 74 is in the first gear.

While not shown in the drawings, a switch may be provided to allow the driver to manually enable or disable the pedal control module 54. When the switch is off, the pedal control module 54 is disabled. Therefore, the pedal resistance cannot be adjusted. When the switch is on, the pedal control module 54 is activated to communicate with some or all of the fuel-efficiency control systems. The pedal control module 54 increases the pedal resistance when the engine 12 is transitioned to a more fuel-efficient mode and decreases the pedal resistance when the engine 12 is transitioned to a less fuel-efficient mode.

Figure 3:
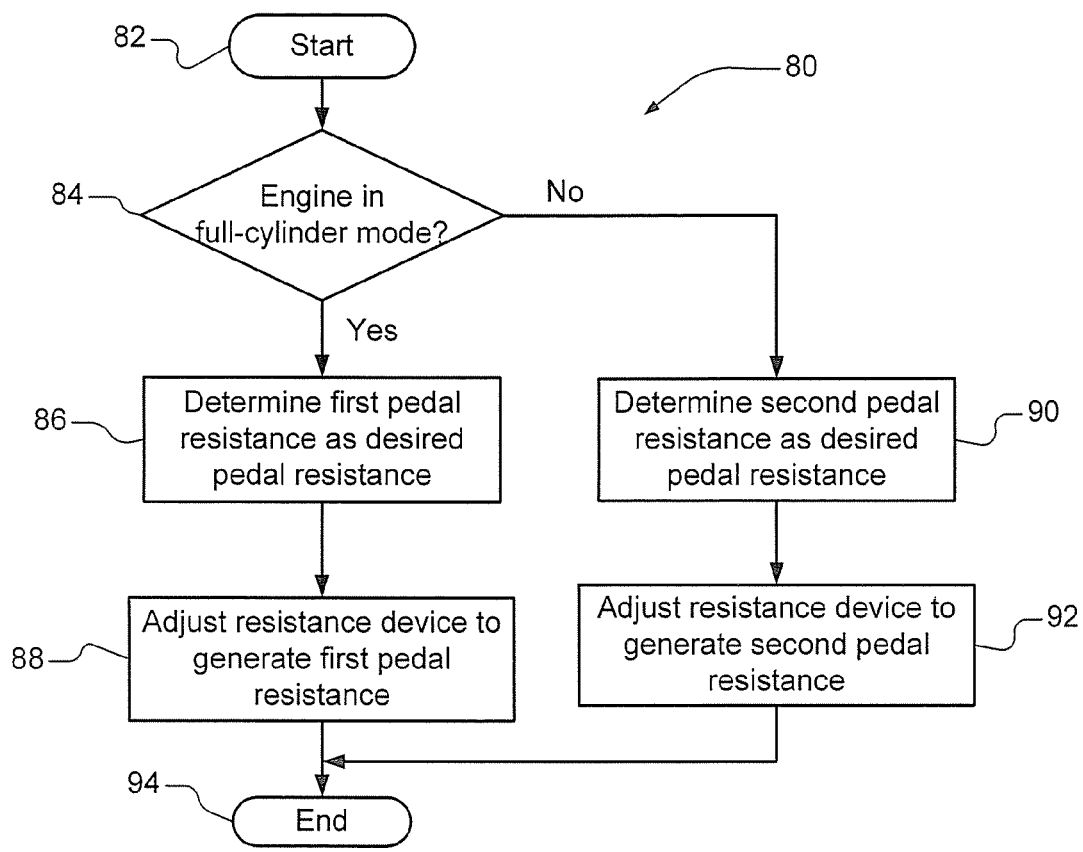
FIG. 3 is a flow diagram of a method of reducing fuel consumption according to the present disclosure.

Referring now to FIG. 3, a method 80 of reducing fuel consumption starts in step 82. The engine mode determination module 58 determines whether the engine 12 runs in a full-cylinder mode in step 84. If the engine 12 is in a full-cylinder mode, the pedal resistance determination module 62 determines a first pedal resistance as a desired pedal resistance in step 86. The pedal resistance adjustment module 64 adjusts the pedal resistance device 44 to produce the first pedal resistance in step 88. If the engine 12 is in a deactivated mode in step 84, the pedal resistance determination module 62 determines a second pedal resistance as a desired pedal resistance in step 90. The pedal resistance adjustment module 64 adjusts the pedal resistance device 44 to produce the second pedal resistance in step 92. The method 80 ends in step 94.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A fuel management system comprising:
   a pedal resistance determination module that determines a desired accelerator pedal resistance based on at least one of engine and transmission operating conditions;
   a pedal resistance adjustment module that adjusts a pedal resistance device based on the desired accelerator pedal resistance; and
   an engine mode determination module that determines engine modes, wherein the desired accelerator pedal resistance varies based on the engine modes,
   wherein the pedal resistance determination module determines a first desired pedal resistance when an engine is in a full-cylinder mode and a second desired pedal resistance when the engine is in a deactivated mode.

2. The fuel management system of claim 1 wherein the second desired pedal resistance is greater than the first desired pedal resistance.

3. The fuel management system of claim 1 wherein at least one of the first desired pedal resistance and the second desired pedal resistance is constant.

4. The fuel management system of claim 1 wherein at least one of the first desired pedal resistance and the second desired pedal resistance varies with mass air pressure (MAP).

5. The fuel management system of claim 1 wherein the first pedal resistance is variable and is increased when engine operating conditions are within a predetermined range of enabling conditions under which the engine is transitioned from the full-cylinder mode to the deactivated mode.

6. The fuel management system of claim 1 wherein the second pedal resistance is variable and is increased when the engine operating conditions are within a predetermined range of enabling conditions under which the engine is transitioned from the deactivated mode to the full-cylinder mode.

7. A fuel management system comprising:
   a pedal resistance determination module that determines a desired accelerator pedal resistance based on at least one of engine and transmission operating conditions; and a pedal resistance adjustment module that adjusts a pedal resistance device based on the desired accelerator pedal resistance, wherein the desired accelerator pedal resistance varies based on gear shifting states of a transmission.

8. The fuel management system of claim 7 wherein the desired accelerator pedal resistance varies with a gear ratio.

9. The fuel management system of claim 7 wherein the pedal resistance determination module determines a first desired pedal resistance when the transmission produces a gear ratio above a threshold and determines a second desired pedal resistance when the transmission produces a gear ratio below the threshold.

10. The fuel management system of claim 9 wherein the second desired pedal resistance is greater than the first desired pedal resistance.

11. A method of reducing fuel consumption comprising:
determining a desired accelerator pedal resistance based on at least one of engine and transmission operating conditions;
adjusting a pedal resistance device based on the desired accelerator pedal resistance; and
determining a first desired pedal resistance when all cylinders of the engine are active and determining a second desired pedal resistance when at least one of the cylinders of the engine is deactivated.

12. The method of claim 11 wherein the second desired pedal resistance is greater than the first desired pedal resistance.

13. The method of claim 11 wherein at least one of the first desired pedal resistance and the second desired pedal resistance varies with mass air pressure (MAP).

14. The method of claim 11 wherein the first desired pedal resistance is variable and is increased when engine operating conditions are within a predetermined range of enabling conditions under which the engine is transitioned from a full-cylinder mode to a deactivated mode.

15. The method of claim 11 wherein the second desired pedal resistance is variable and is increased at least when engine operating conditions are within a predetermined range of enabling conditions under which the engine is transitioned from a deactivated mode to a full-cylinder mode.

16. A method of reducing fuel consumption comprising:
determining a desired accelerator pedal resistance based on at least one of engine and transmission operating conditions;
adjusting a pedal resistance device based on the desired accelerator pedal resistance; and
determining a first desired pedal resistance when a transmission produces a first gear ratio and a second desired pedal resistance when the transmission produces a second gear ratio.

17. The method of claim 16 wherein the second desired pedal resistance is greater than the first desired pedal resistance and the second gear ratio is less than the first gear ratio.

* * * * *